July 9, 1968
D. F. HAYS, JR
3,391,474
ROTATABLE WORK ASSEMBLY TABLE AND ASSEMBLY
METHOD UTILIZING THE SAME
Filed Dec. 18, 1964
2 Sheets-Sheet 1
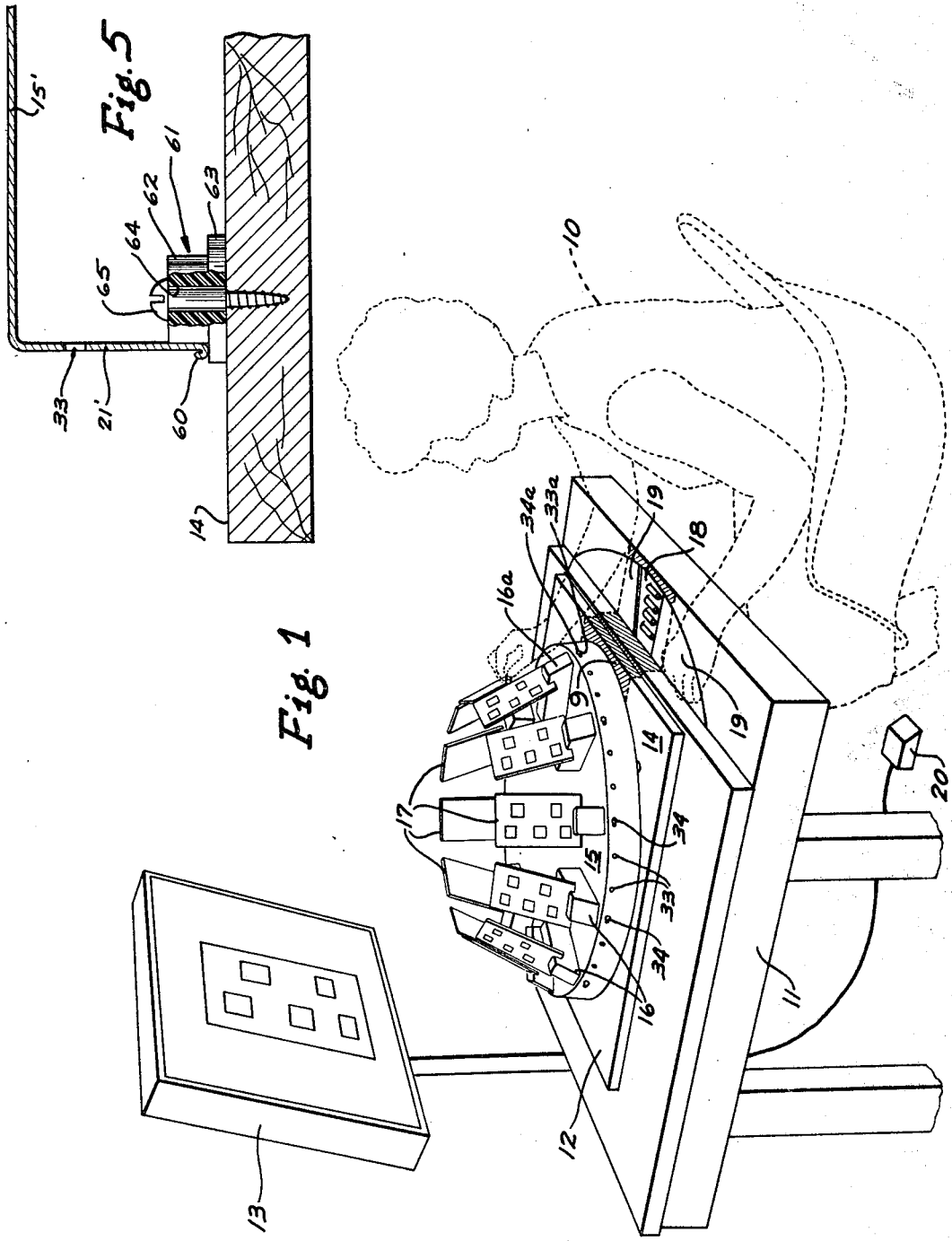
INVENTOR.
DONALD F. HAYS, JR.
BY
Harry B. Keck
ATTORNEY

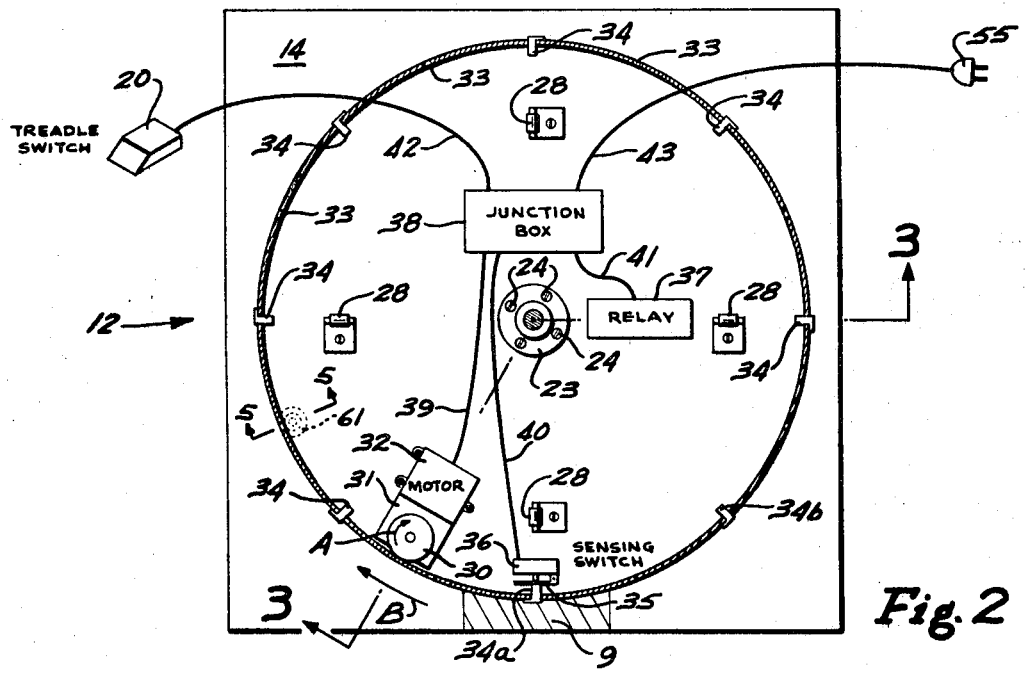

United States Patent Office

3,391,474
Patented July 9, 1968

---

3,391,474
ROTATABLE WORK ASSEMBLY TABLE AND ASSEMBLY METHOD UTILIZING THE SAME
Donald F. Hays, Jr., Westerville, Ohio, assignor to International Research and Development Corporation, Worthington, Ohio, a corporation of Ohio
Filed Dec. 18, 1964, Ser. No. 419,299
3 Claims. (Cl. 35—13)

This invention concerns a rotatable table which is especially adapted for use in the assembly of multi-component duplicate articles and to a method for assembling such multi-component duplicate articles. The present work assembly table comprises a step-wise rotatable work supporting surface which receives a plurality of incomplete multi-component duplicate articles and supports them during the completion of assembly. The incomplete articals art disposed in spaced relation around the rim of the work supporting table. Upon rotation of the work supporting table, the articles pass serially to an assembly station where an operator performs identical work on each of the incomplete articles. For example, if the incomplete articles are electronic devices the incomplete article would be the chassis, and a first work operation by the operator might be the affixation of a transformer to each chassis; a second work operation might be the affixation of an electron tube receiving socket to each chassis; a third, a resistor each; a fourth, two capacitors each; et cetera.

The present work assembly table is especially useful in combination with an automatic work table as described in co-pending U.S. Patent application S.N. 164,370, now Pat. No. 3,154,865, filed Jan. 4, 1962, by John W. Conner. Such automatic work tables provide for the sequential delivery of component-containing compartments to a position of ready access for an assembly operator. One of the objectives of the said automatic work tables is to provide multiple components to an assembler in the proper sequence for assembly into a multi-component article.

With the said automatic work tables, the assembly operator sequentially installs different components until a single multi-component assembly is completed. This may require changing of assembly tools for each component and usually will require reference to assembly instructions for each component.

With the present rotatable work assembly table integrated with the prior art automatic work tables, the assembly operator can perform one work operation on each of a plurality of different incomplete articles with the same tools and without repeated reference to assembly instructions. After that one work operation has been performed on all of the incomplete articles, the operator thereafter performs a next-operation on each of the incomplete articles.

Objects

An object of this invention is to provide a rotatable work assembly table which will support a plurality of multi-component duplicate articles and, upon step-wise rotation, will sequentially deliver each of the said articles to an assembly station for convenient manipulation by a sole assembly operator.

Another object is to provide a step-wise rotatable table which, upon activation by an operator, will rotate from one stationary position for less than one complete rotation to a different predetermined stationary position where the table will remain until further activation by the operator.

A further object is to provide a method for assembly of a plurality of multi-component duplicate articles.

These and other objects of the present invention will become apparent from the following detailed description by reference to the accompanying drawings in which:

FIGURE 1 is a perspective view of the present rotatable work assembly table mounted for operation upon an automatic work table of the type described in the aforesaid Conner patent application;

FIGURE 2 is a plan view of the present work assembly table;

FIGURE 3 is a cross-section view of the present work assembly table taken along the line 3—3 of FIGURE 2;

FIGURE 4 is a schematic illustration of electrical circuitry adapted for achieving the desired step-wise movement in the present work assembly table; and FIGURE 5 is a fragmentary cross-section view taken along the line 5—5 of FIGURE 2 showing a preferred embodiment of table support means.

Referring to FIGURE 1 there is illustrated an assembly operator 10 seated before an automatic work table 11, the present rotatable work assembly table 12 and a visual presentation screen 13. The automatic work table 11 corresponds to that of the aforementioned Conner patent application. The present rotatable work assembly table 12 includes a base member 14 and a circular, rotatable work supporting surface 15. A plurality of work supporting blocks 16 are mounted on the top of the work supporting surface 15. Each of the blocks 16 can support an incomplete multi-component article 17. The work supporting surface 15 is rotated about a vertical central axis whereby each of the incomplete articles 17 is presented in direct confrontation to the operator 10 in an assembly station which is indicated by the shaded region 9. The operator 10 performs a work operation upon each of the incomplete articles 17 while that article remains in the assembly station 9.

The individual work operation may comprise, for example, the installation of a specific resistor in each of the individual incomplete articles 17. The assembly operator will obtain the necessary material for performing the specific work operation from suitable component delivery means having an access opening 18 in the work table 11.

The automatic work table 11 may include an access opening 18 which is presented between two pivotal cover plates 19. In successive assembly stages, different components are provided in the compartments which are exposed beneath the access opening 18.

It is known in the prior art to provide a pictorial reproduction of the article 17 on the screen 13. A light source is provided behind the screen 13 to illuminate that component which is contained in the compartment beneath the access opening 18. Thus the operator 10 receives a supply of the component (to be installed) from the access opening 18 and installs that component in each of the incomplete articles 17 in accordance with the visual instructions presented upon the screen 13. After one of the individual components is assembled on a first one of the incomplete articles 17, the operator depresses a treadle switch 20 which causes the work supporting surface 15 to rotate for a fraction of one complete rotation until the next succeeding incomplete article 17 is presented stationary in the assembly station 9.

After all of the incomplete articles 17 have received the desired component from the compartment beneath the access opening 18, the automatic work table 11 is activated in any suitable manner whereby a different component (to be next assembled) is presented beneath the access opening 18 and the appropriate component is illuminated on the visual presentation screen 13.

With the present invention, the operator assembles a plurality of multi-component duplicate articles by performing an identical work operation on each of the individual articles before proceeding to the succeeding work operations.

Rotatable table

The rotatable table 12 has a base 14 which may comprise a rectangular sheet of wood, metal, plastic and the like with a hub 23 fastened thereto by screws 24. A disk-like bearing block 25 (for example, a nylon disk) fits in the hub 23. A shaft 26 rests on the block 25 and is rotatable within the hub 23.

The work surface 15 is preferably circular with a peripheral side wall skirt 21 and a central aperture 22. A bolt 27 extends through the aperture 22 and is threadedly engaged in the shaft 26 to provide rotatable mounting of the work surface 15 about a vertical axis shown by the broken line X—X.

A plurality of rollers 28 each mounted for rotation in a bracket 29 may be provided for supporting the work supporting surface 15. The brackets 29 may be fastened to the base 14 by means of screws as shown. An alternative and preferred supporting means is illustrated in FIGURE 5.

*Driving means.*—A driving wheel 30 is mounted in peripheral engagement with the inner surface of the side wall skirt 21. The drive wheel 30 is connected through a gear reducing box 31 to an electric motor 32 which is secured to the base 14 by screws as shown. Rotation of the drive wheel 30 in the direction of the arrow A (FIGURE 2) causes rotation of the work surface 15 in the direction of the arrow B.

*Predetermining step-wise movement.*—A plurality of spaced apertures 33 is provided in the side wall skirt 21 for receiving suitable stop members 34 which are clipped to the skirt 21 to extend interiorly beneath the work supporting surface 15. The stop members 34 are provided at the same radial distance from the vertical axis X—X. During rotation of the work supporting surface 15, the stop members 34 pass through a circular locus which overlaps the path of travel of an actuating arm 35 of a sensing switch 36 which is fastened to the base 14.

The number of stop members 34 determines the number of stationary dwell periods which are provided for each complete rotation of the work supporting surface 15. The circumferential spacing of the stop members 34 determines the distance between stationary positions.

Referring to FIGURE 1, it will be seen that a stop member 34a is clipped to the aperture 33a directly beneath the block 16a. With the sensing switch 36 located adjacent to the assembly station 9 (FIGURE 2), each stop member 34 will create a stationary dwell for the work supporting surface when that stop member is centrally positioned in the assembly station 9.

A suitable electromechanical relay 37 is fastened to the base 14 for purposes which will be described in connection with FIGURE 4. A junction box 38 is shown as fastened to the base 14 for electrically interconnecting the electrical circuit elements by wiring 39, 40, 41, 42, 43.

Electrical circuitry

The electrical circuitry for the present rotatable table includes the relay 37, the motor 32, the sensing switch 36 and the treadle switch 20. The relay 37 has a relay coil 44 and two relay switches 45, 46 which are mechanically ganged as shown. The first relay switch 45 includes an open contact 47 and a motor contact 48. The second relay switch 46 includes an open contact 49 and a sensing switch contact 50. A sensing switch 36 has a relay switch contact 51 and a motor contact 52. The treadle switch 20 has an open contact 53 and a relay coil contact 54. An electrical power source is designated by a plug 55 which is adapted for connection with a power supply.

The electrical circuitry shown in FIGURE 4 is illustrated in its normal position representing switch positions during a stationary dwell period. It will be seen that neither the motor 32 nor the coil 44 of the relay 37 is connected to the power source.

Operation

The operator activates the circuit by depressing the treadle switch 20 to engage the contact 54 and close a first electrical circuit including the treadle switch 20 and the relay coil 44, thus sending current through the relay coil 44 and causing both relay switches 45, 46 to move to activated positions at contacts 48, 50 respectively. A second electrical circuit is closed thereby including a conductor 56, the first relay switch 45 and the motor 32. Likewise a third electrical circuit is closed including the sensing switch 36, the second relay switch 46 and the relay coil 44. Thus through the third electrical circuit, the relay coil remains energized after the treadle switch 20 has disengaged from the relay contact 54 and returned to the open contact 53.

The sensing switch 36 is itself normally biased to engagement with the motor contact 52, but, when the actuating arm 35 is depressed by a stop member 34a (FIGURE 2) in a stationary position, the actuating arm 35 engages the relay contact 51 as seen in FIGURE 4. When the relay coil 44 is energized, the second electrical circuit closes through the first relay switch 45 at motor contact 47 and the motor 32 turns to cause rotation of the work supporting surface 15 in the direction of the arrow B (FIGURE 2) whereby the stop member 34a passes beyond the sensing switch 36 and releases the activating arm 35. Thereby the arm 35 moves to motor contact 52 to close a fourth electrical circuit including the sensing switch 36 and the motor 32. The movement of the activating arm 35 also opens the third electrical circuit by disengagement from the relay contact 51 whereby the relay coil 44 is disconnected from the power sources 55 and deactivated. Upon deactivation of the relay coil 44, both relay switches 45, 46 return to the open contacts 47, 49 respectively.

The motor 32 continues to turn until the next-in-sequence stop member 34b engages the activating arm 35 (FIGURE 2) and moves the activating arm 35 out of engagement with the motor contact 52 and into engagement with the relay contact 51. The motor 32, thereby disconnected from the power source, is stopped and the circuitry is restored to the relationship shown in FIGURE 4.

It will be observed that the four described electrical circuits provide alternative parallel paths between the points C and D of FIGURE 4.

Further, when the operator 10 desires, for any reason, to pass through one or more stationary dwell positions, the continuous depression of the treadle switch 20 will maintain the first electrical circuit closed (i.e., the treadle switch 20 and the relay coil 44) whereby the motor 32 will continue turning the surface 15 through the said second circuit (conductor 56, first relay switch 45 and motor 32) until the treadle switch 20 is released.

Alternative support means

As shown in FIGURE 2 and FIGURE 5, the present work assembly support surfaces may be supported peripherally about its lowermost rim by means of rotatable shouldered washers 61 which replace the support bearings 28.

Referring to FIGURE 5, the work supporting surface 15' and the side wall skirt 21' are assembled as a one-piece sheet metal stamping. A rolled bottom rim 60 is preferably provided. For this purpose 18-gauge steel is ideal.

A plurality of shouldered washers 61 are provided in a circular locus about the axis of rotation. Each of the shouldered washers 61 has an upper small diameter portion 62 and a lower large diameter portion 63. The shouldered washers 61 have a central bore 64 and are rotatably secured to the base member 14 by means of a screw 65 extended through the bore 64. The rim 60 rests upon the upper surface of the lower portion 63 of each shouldered washer 61. The inner surface of the side-wall skirt 21' is peripherally engaged adjacent to the rim 69 with the cylindrical surface of the upper portions 62 of each shouldered washer 61. Preferably the shouldered washers 61 are fabricated from tough plastic substances such as nylon, polycarbonates and the like. From three to six such shouldered washers will accommodate the support requirements for the present device in most circumstances.

I claim:
1. An automatic work table adapted for use by a sole operator in the assembling of a plurality of duplicate multi-component articles, including:
   an article-supporting surface mounted for rotary movement about a vertical axis;
   a plurality of support means, corresponding to the number of said articles, secured to said article supporting surface;
   motor means beneath the said surface adapted to rotate said surface about said axis by frictional engagement with said surface;
   a plurality of stop-members secured relative to and integral with said surface at a uniform radial distance from the said axis and corresponding to the number of said articles;
   operator-activated control means for starting rotation of the said surface;
   automatic control means beneath said surface for terminating rotation of the said surface in response to engagement of one of the said stop-members with the said automatic control means.

2. In an automatic rotatable table adapted to move in a predetermined fractional part of a complete rotation in a repetitive manner in response to operator-activation thereof:
   an article supporting surface mounted for rotary movement about a vertical axis, motor means beneath the said surface adapted to rotate said surface about said axis;
   a plurality of stop members secured to said surface at a uniform distance from the said axis;
   an operator-activated switch including an open contact and a relay-coil contact being normally biased to engagement with the said open contact; a sensing switch secured beneath the said surface in a fixed position and including a motor contact and a relay switch contact and being normally biased to engagement with said motor contact; a first relay switch including an open contact and a motor contact; a second relay switch including an open contact and a sensing switch contact; said first and second relay switches being mechanically ganged and controlled by a common relay coil whereby both said relay switches are engaged with an open contact in one switch position and engaged with a closed contact in the alternate switch position;
   a first electrical path including said relay coil and said operator activated switch through the said relay coil contact thereof; a second electrical path including said first relay switch through the said motor contact thereof and the said motor means; a third electrical path including the said relay coil and the said sensing switch through the said relay contact thereof and the said second relay switch through the said sensing contact thereof; a fourth electrical path including said motor means and said sensing switch through the said motor contact thereof;
   said sensing switch being disposed at a distance from said axis such that the said stop members sequentially engage the said sensing switch to hold it in engagement with the said relay switch contact thereof while the said surface is stationary.

3. A rotatable table having a generally horizontal circular surface and a peripherally depending skirt terminating in a horizontal circular rim below the said surface, said table being centrally secured to a rotatable vertical shaft,
   a plurality of shouldered washers, each being rotatably mounted for free rotation about its central axis and having a lower portion with a large diameter and an upper portion with a lesser diameter, the said shouldered washers being disposed in a circular locus about the axis of said shaft,
   the said rim resting on the upper surface of the said lower portion and the inner surface of the said skirt adjacent to the said rim being in peripheral engagement with the cylindrical surface of the said upper portions.

References Cited
UNITED STATES PATENTS

| | | | |
|---|---|---|---|
| 1,278,584 | 9/1918 | Bucheit | 108—94 |
| 1,490,326 | 4/1924 | Joleen et al. | 108—21 |
| 2,209,858 | 7/1940 | Steiert | 108—21 |
| 2,890,088 | 6/1959 | Lepry et al. | 108—20 |
| 3,142,269 | 7/1964 | Keck | 108—103 |
| 3,154,865 | 11/1964 | Conner | 35—13 |
| 2,922,640 | 11/1960 | Fornell et al. | 270—58 |
| 2,951,697 | 9/1960 | Bernart et al. | 270—58 |

EUGENE R. CAPOZIO, *Primary Examiner.*

W. W. NIELSEN, *Assistant Examiner.*